United States Patent [19]
Pauley et al.

[11] Patent Number: 5,191,210

[45] Date of Patent: Mar. 2, 1993

[54] PRODUCED STEAM SURVEY DEVICE AND METHOD

[75] Inventors: James C. Pauley, Bakersfield, Calif.; Irwin R. Supernaw; Thomas M. Williams, both of Houston, Tex.

[73] Assignee: Texaco Inc., White Plains, N.Y.

[21] Appl. No.: 819,732

[22] Filed: Jan. 13, 1992

Related U.S. Application Data

[63] Continuation-in-part of Ser. No. 679,482, Apr. 2, 1991, abandoned.

[51] Int. Cl.$^5$ .................................................. G01V 5/04
[52] U.S. Cl. .................................. 250/260; 250/259; 250/266; 250/303
[58] Field of Search .............. 250/259, 260, 265, 266, 250/269, 303

[56] References Cited

U.S. PATENT DOCUMENTS 4,861,986 8/1989 Arnold .............................. 250/260

FOREIGN PATENT DOCUMENTS 263765 6/1970 U.S.S.R. .............................. 250/260

Primary Examiner—Constantine Hannaher
Assistant Examiner—Edward J. Glick
Attorney, Agent, or Firm—Jack H. Park; Kenneth R. Priem; Russell J. Egan

[57] ABSTRACT

A device and method for determining the flow of steam in a production well has a sonde with a pair of gamma ray detectors and a source of gaseous radioactive material therein. The sonde is lowered into the well and measured amounts of the gas are released and detected by the gamma detectors to thereby determine the volume and velocity of steam flowing in the production well as well as its depth of entry.

10 Claims, 3 Drawing Sheets

PRODUCED STEAM SURVEY DEVICE AND METHOD

CROSS REFERENCE TO RELATED PATENT APPLICATION

The present application is a continuation-in-part of our patent application Ser. No. 07/679,482 filed Apr. 2, 1991 now abandoned.

BACKGROUND OF THE INVENTION

1. The Field of the Invention

The present invention relates generally to thermally enhanced oil recovery and more specifically to a method and apparatus for accurately profiling the steam flow through the formations of a field.

2. Background of the Invention

It has often been the case that crude oil, in its natural state, is sufficiently viscous as to require the injection of means, such as surfactants or heat, into the reservoir in order to increase the fluidity of the crude oil and drive it to a production well where it can be recovered. This is often done by the injection of steam into a plurality of injection wells in a spaced array in the reservoir. Ideally the reservoir would be completely homogeneous and the steam entering from each injection well would flow evenly to all portions of the reservoir and drive all of the crude oil to recovery wells. However, it is the actual case that the reservoir is formed by a plurality of pockets of crude oil in formations which can be extensive in that they span a large area intercepting both injection and recovery or production wells. These formations can be discontinuous, at certain levels, and they can also be interconnected by fissures or fractions. Steam injected into a formation at a first level can actually arrive at the production well from a completely different formation at a different, usually shallower, second level. Normally the steam, which is less dense than the in situ crude and other fluids within the formation, will be rising as it moves outwardly through the field from the injection well. Eventually steam breakthrough will occur, which means the steam will have formed at least one path between an injection well and at least one production well. Any subsequently injected steam will follow this path which will be the path of least resistance between the injection and production wells. This path may override and/or bypass large portions of the petroleum reservoir in that particular formation.

There have been a number of methods and devices proposed for monitoring the injection of steam into an injection well with the monitoring determining both the quality and the quantity of the steam that is being injected and the rate of steam flow. It is even possible, with the use of proper tools, to confine the steam injection to a specific zone of the injection well so that the level at which the steam is entering the formation is known. However, it is highly unlikely that the steam will arrive at that same level at a production well because of the tendency for steam to rise as it moves outwardly from the injection well and geological faults or fissures which may be present within the reservoir.

The steam may cross formation boundaries and not stay in the originally injected formation for any of a number of reasons. For example, the injected formation may pinch out or meet a permeability barrier between the injection and production wells. All oil bearing zones penetrated by the production well may not exist at the injection well and vice versa. Any of these might cause the steam to arrive at the production well in a formation different from the one into which it was originally injected.

In the above-noted methods and apparatus for measuring the steam movement, it has been known to use radioactive tracers. For example, krypton (85) has been used to trace the vapor phase and sodium iodide (131) has been used to trace the liquid phase of steam. In either case the isotope is generally injected into the steam line between the injection well and the steam generator and moves down the well tubing with the steam until it reaches the formation where the isotope remains near the face of the formation for a brief period. One measurement method then runs a typical gamma ray log immediately following the tracer injection and the recorded gamma ray intensity at any point in the well is then assumed to be proportional to the amount of steam injected into the formation at that point. Another measuring method employs a downhole detector that senses the tracer as it goes by. By placing detectors at various points between formations, the amount of steam going into each formation can be deduced.

However, very little, if any, effort has been made to determine where the steam comes out of a formation at the production well and what the source of that steam may be. If the level at which the steam enters the production well is not known, then it would not be possible to make an accurate determination as to where override might have occurred or if, in fact, there were pockets of petroleum in formations which were not being contacted by this steam at all. If there is a determination as to the level at which the steam is entering the production well, then it would be possible, for example, by blocking off release of steam at the surface of the production well, to force the steam to flow back into formations which had escaped the initial or original steam flow.

SUMMARY OF THE INVENTION

The present invention comprises a method and apparatus for measuring the quantity and location of steam arriving at a production well from a steam flood. There may be some steam movement from one zone into another zone between the injection and producing wells. The present invention enables confirmation and documentation of this phenomenon by comparison of the zone of steam input at the injection well with the zone of steam exit in the production well, which may not be the desired zone.

The present invention relates to a method and apparatus for determining the level and quantity of steam arriving in a production well from a steam flood. The subject apparatus includes an elongated tool having a releasable gaseous radioactive tracer and at least a pair of gamma detectors. Proper configuration of the tool allows it to be used to determine either upward or downward flow of steam as well as the rate and quantity of steam entering the production well. In order to measure the steam profile in the production well, the tracer must be injected near the detectors in a short time interval so as to create a pulse in the detector.

BRIEF DESCRIPTION OF THE DRAWINGS

The present invention will now be described by way of example with reference to the accompanying drawings in which.

DETAILED DESCRIPTION OF THE PREFERRED EMBODIMENT

Figure 1:
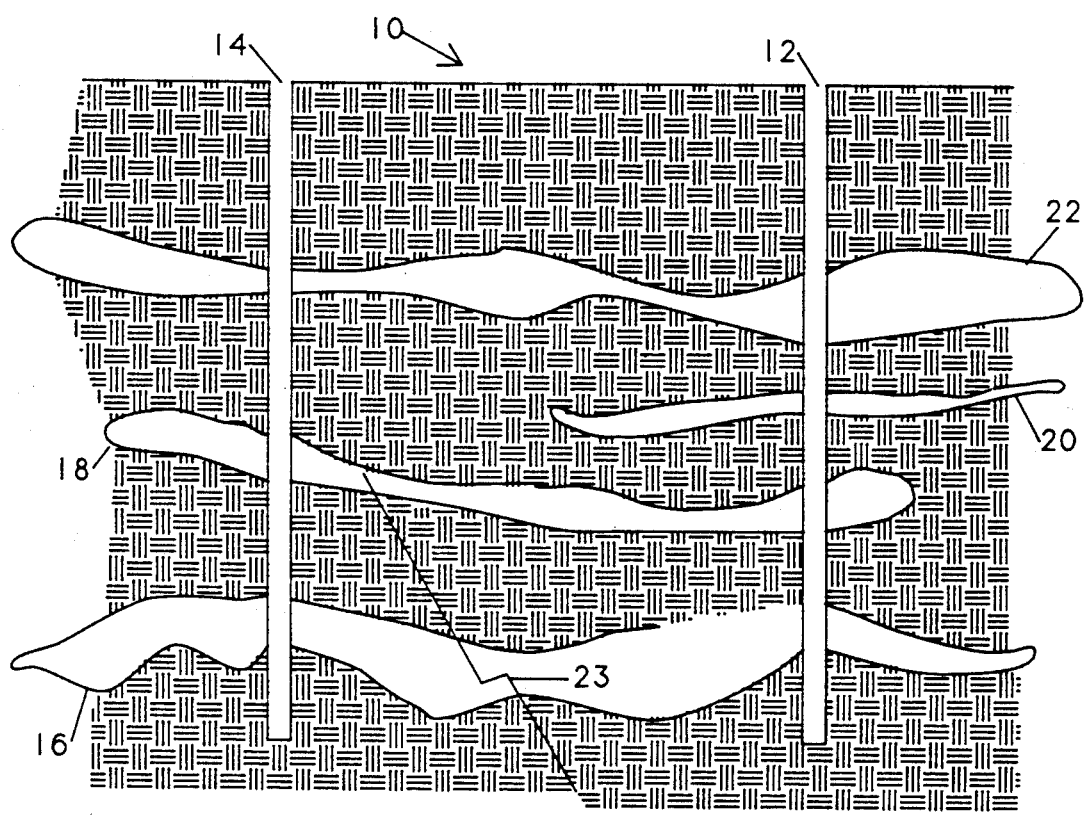
FIG. 1 is a schematic vertical section through a representative field employing steam flooding for enhanced oil recovery.

FIG. 1 is a schematic vertical section through a producing field which has been subjected to enhanced oil recovery by means of steam flooding. The field 10 is penetrated by a patterned array of boreholes some of which are used as steam injector wells 12 and others are producing or recovery wells 14. Each well is provided with the appropriate equipment (not shown) for injecting steam or recovering petroleum products. In this illustration the field has a number of petroleum containing strata 16, 18, 20, 22, not all of which, note 20, extend across the entire field and are penetrated by all wells. Steam, as it moves into the field formations from the injection well 12, does not follow a linear path but instead seeks the path of least resistance and, because it is less dense than the liquids in the porous formation, tends to rise towards the surface as it moves outwardly from the injection well. Thus the injected steam usually arrives at the production well at a lesser depth than it was inserted into the formation at the injection well. This breakthrough of the steam at the production well is called steam override and implies that the steam has missed at least a portion of the volume of the formation into which it was injected. This override can also be caused by other reasons, such as a geologic fault 23 similar to that shown intersecting formations 16 and 18, which may cause the steam to completely change formations possibly missing substantial portions of one or more of the formations.

Thus it becomes important to not only know the quality, quantity of steam entering an injection well and the depth at which that steam enters a formation, but it is important to know where that steam is when it arrives at the production well. This knowledge enables the production engineer to decide what courses of action to take to insure more complete and efficient recovery of oil from the field.

Figure 2:
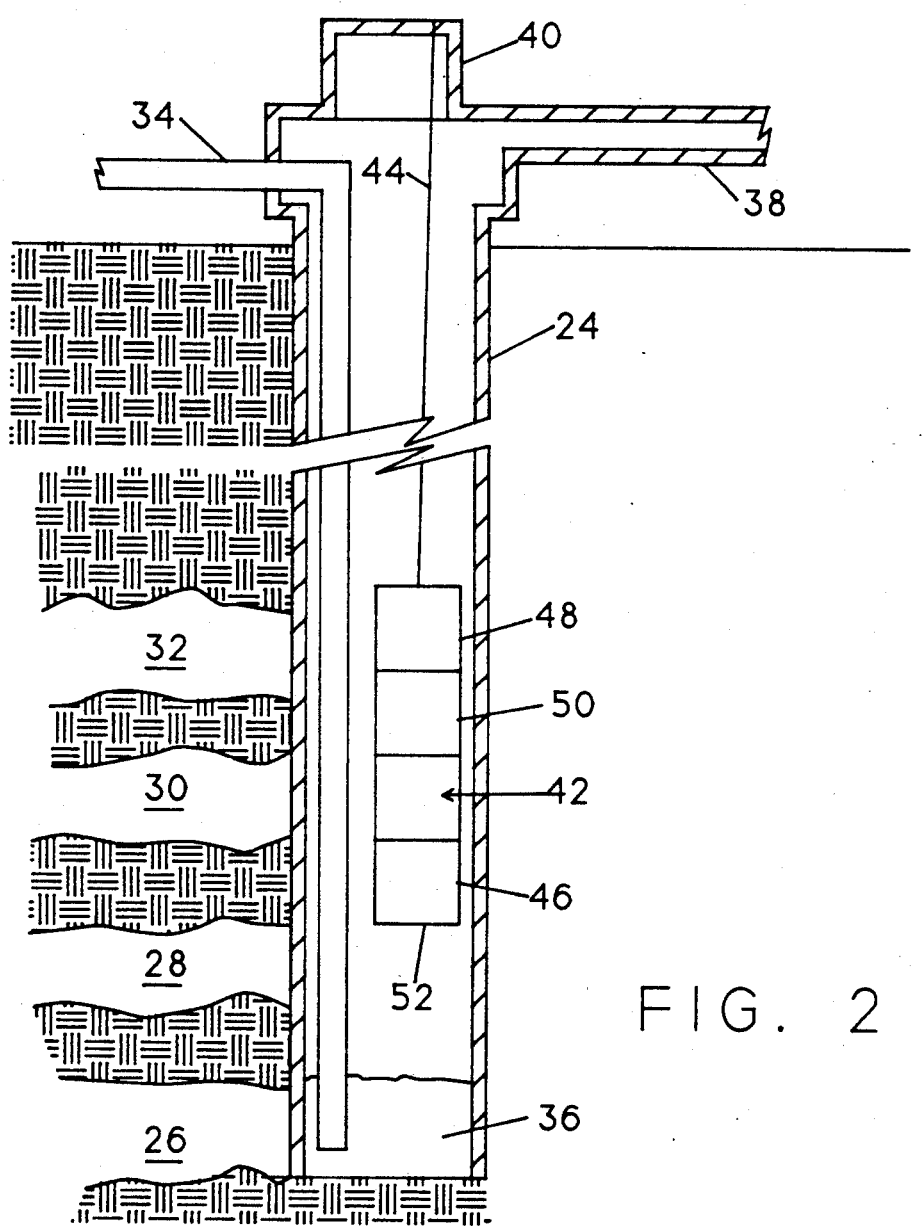
FIG. 2 is a schematic illustration of a production well and the subject tooling being used to determine the steam flow.

FIG. 2 is a schematic representation of a typical production well with the well 24 penetrating formations 26, 28, 30 and 32. The well has a production pipe 34 extending from the surface to the liquid 36 at the bottom of the well. At the top of the casing there is a wellhead 38 through which the produced steam and gases rise and which contains an access means 40 through which a logging sonde according to the present invention can be lowered into the well. The subject sonde 42 is lowered by means of cable 44 with the sonde having an elongated, generally cylindrical housing 46 including first and second gamma detectors 48, 50 and a source of gaseous radioactive tracer in an assembly 52 adapted to be triggered from the surface to allow selective release of short time bursts of the tracer element.

In the setup shown in FIG. 2, the tracer element assembly 52 is at the lower end of the logging sonde and the gamma detectors 48, 50 are at the upper end. As shown the sonde has been lowered to between formations 28 and 30 and we will assume, for purposes of illustration, that the steam from the injection well is entering the production well 24 from formation 28 The steam entering the well will flood the wellbore with more of the steam rising than falling. The means (not shown) controlling the release of the radioactive tracer would be actuated to cause a release of a measured amount of the tracer element as a burst in a short time interval. Each gamma detector 50, 48 senses the arrival of tracer element in the steam as the steam passes and causes a detection pulse to be generated by the respective detectors. The timing of these detection pulses is used to determine the velocity and volume of the steam flowing upward from the permeable zone 28. The velocity of the steam will be determined by measuring the difference in time of arrival of the radioactive tracer at the two detectors, namely the time differential between the detector pulses. The volume can be calculated from the velocity and the well casing and tubing information (i.e. the effective well cross section). The method for doing this is described in U.S. Pat. No. 4,102,185, owned by the common assignee, and the disclosure of which is incorporated therein by reference. One difference between the present invention and this reference is that, in the present case, the steam is produced in the annulus and the liquid is produced in the production tubing. Therefore, the sonde is placed in the annulus where the effective cross section is the casing interior cross sectional area minus the production tubing outer cross sectional area minus the sonde cross sectional area. All of these cross sectional areas can be readily measured or otherwise determined.

Since steam is a compressible fluid, to determine the steam flow rate in units other than $ft^3/sec$ at borehole conditions, it will be necessary to know the steam temperature and absolute pressure at the detectors. Standard steam tables can be used to determine the density of the steam at borehole conditions. With this information, the $ft^3/sec$ at borehole conditions can be converted to cold water barrels/day equivalent or to pounds/minute. The steam temperature and pressure can be measured by adding additional instruments to this sonde, by running a separate sonde in the well to gather this information, or by measuring the temperature and pressure at the surface and making any necessary adjustments to the data.

In the instance that the steam is entering the production well 24 from zone 30 and with the sonde located as shown, release of the radioactive tracer would result in the steam carrying the tracer downward away from the gamma detectors 48, 50, at least initially, so that no detection pulses would be generated. This in and of itself would indicate that the source of the steam entering the production well is above the sonde 42. In this instance two things can be done to make a proper measurement, namely, raise the sonde to above the next known permeable zone 16 and release a second burst of a measured amount radioactive tracer or bring the sonde 42 all the way to the surface, reconfigure it so that the tracer supply 52 is above the gamma detectors, 48, 50 and lower the sonde to the same depth as where the previous measurement was made. Release of the second burst of tracer element from the source would be detected by the gamma detectors 48, 50 to show the volume and velocity of the steam flowing downwardly from the zone 30.

Again, in the situation as described, if it is known that the zone 26 is rich in crude and requires steaming, it would be possible to close down the production well, if there is a sufficient volume of steam entering it, with this steam subsequently filling the well and backfilling into the permeable zones. Of course, in this situation and depending upon reservoir and zone pressures and permeabilities, the steam may still make a greater penetration in the upper zones 30,32 rather than it would in the zones 26 and 28.

Figure 3:
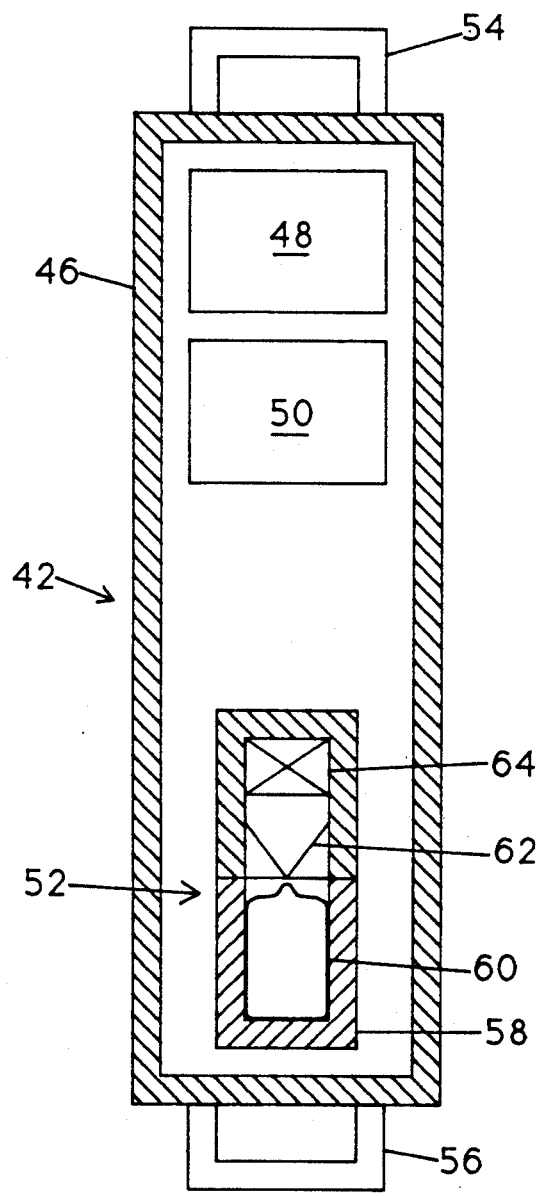
FIG. 3 is an enlarged vertical section through an embodiment of the subject tool.

FIG. 3 shows the subject sonde 42 in somewhat greater detail in vertical section. The housing 46 is an elongated member having means 54, 56 for attachment to cable 44 to form either of the above mentioned two operating configurations. As mentioned above, the gamma detectors 48, 50 are of known design and configuration and would be mounted in the housing 46 in conventional fashion.

The assembly 52, which contains the source isotope, is preferably designed along the lines of what has been illustrated. The assembly 52 comprises a plurality of receptacles 58 each profiled to receive therein a single standard sized glass vial 60 containing a measured amount of the isotope. For obvious safety reasons, these glass vials are made of very strong glass to prevent accidental breakage. This admirable trait makes them difficult to break in order to deploy the isotope. The present invention includes a ram 62 actuated by electromechanical means 64. It will be readily appreciated by those skilled in the art that receptacle 58 could be in the form of a carrousel, if space permits, or a series of receptacles, each with an associated ram, could be stacked in the housing, or, as a further alternative, the ram could act transversely of the sonde to sequentially break stacked vials.

Using two detectors makes it unnecessary to know the distance to the source or time of breakage of the vial. Velocity is determined by elapsed time between arrival of the isotope at the respective detectors. If only one detector is used, it would be possible to determine the velocity of the steam if the distance from the detector to the vial and the time of tracer release are known.

The present invention requires that the tracer must be injected into the well near the detectors so that it will not become unduly diluted. Also the tracer must be released into the well in a short time interval so that when it is detected by the detectors it will have sufficient mass to cause the detectors to generate sharp detection pulses.

The present invention may be subject to many modifications and changes without departing from the spirit or essential characteristics thereof. The present embodiment should therefore be considered in all respects as being illustrative and not restrictive as to the scope of the invention.

We claim:

1. A method for determining the flow rate of steam entering a production well from a steam flooded formation comprising the steps of:
   providing a sonde having therein a pair of spaced gamma detectors and a source of radioactive gas and means to release measured amounts of said gas into said well;
   determining the effective cross-sectional area of the production well;
   lowering said sonde into said production well;
   releasing a measured amount of radioactive gas into the well in a short rapid burst so as to create a pulse at the detectors; and
   measuring said radioactive gas as it flows past said gamma detectors whereby the velocity and volume of steam can be determined.

2. According to claim 1 wherein the gamma detectors are above the radioactive gas source so that steam flow up through the well from a formation can be determined.

3. The method according to claim 1 wherein the radioactive gas source is above the gamma detectors whereby steam flowing down through the well from a formation can be detected.

4. The method according to claim 1 wherein the effective cross sectional area of said well is the inside area of the well casing minus the outside area of the sonde minus the outer area of the production tubing.

5. The method according to claim 1 wherein the velocity of the steam is determined for the time differential in the detection of the radioactive gas by the detectors and the volume of steam is determined for the effective cross-sectional area of the well times the time period.

6. A device for determining the velocity and volume of steam passing through a well comprising:
   an elongated sonde housing;
   first and second gamma detectors mounted in said housing toward one end thereof; and
   a source of radioactive gaseous material with means to release a measured amount of said material into said well in a short time interval, said source being mounted in said housing toward the opposite end thereof whereby flow of said gaseous radioactive material past said detectors is used to measure the volume and velocity of the steam moving in the well.

7. The device according to claim 6 wherein said gamma detectors are located above the gaseous radioactive material source.

8. The device according to claim 6 wherein said gamma detectors are located below the gaseous radioactive material source.

9. The device according to claim 6 wherein the radioactive gas is contained in a plurality of modules which modules can be sequentially opened allowing release of individual measured amounts of radioactive gas into the well.

10. The device according to claim 9 wherein the gas is initially contained in individual vials and said means to release comprises means to open said vials in response to a signal from the surface.

* * * * *